Dec. 6, 1932. G. A. MONTGOMERY 1,889,868
DOUBLE BOX ROTARY TOOL JOINT
Filed July 21, 1930

Inventor
Gustavus A. Montgomery
By Jesse R. Stone
Attorney

Patented Dec. 6, 1932

1,889,868

UNITED STATES PATENT OFFICE

GUSTAVUS A. MONTGOMERY, OF DALLAS, TEXAS

DOUBLE BOX ROTARY TOOL JOINT

Application filed July 21, 1930. Serial No. 469,337.

My invention relates to tool joints or pipe couplings employed in connecting together the adjacent ends of tubes or pipe. It has particular application to drill stems employed in deep well drilling operations, where the joints are subjected to heavy torsional strain due to rotation of the drill stem in driving the drill.

This invention is an improvement upon the structure shown in my co-pending application No. 373,356 filed June 24, 1929, and has for its object the provision of a pipe coupling having no inner stop shoulder to limit the inward screwing movement of the pipe ends, but which provides a separate removable resilient cushion centrally of the coupling.

I desire to form a yielding sealing member between the pipe ends, which may be secured against rotation within the coupling but which has a limited longitudinal movement and radial expansion in the coupling.

I further aim to provide means to prevent leakage of fluid about the joint.

The invention includes also a suitable means for preventing rotation of the sealing member but which allows for longitudinal movement thereof axially of the joint against the friction of packing means between said member and the bore of the coupling.

In the drawing herewith, Fig. 1 is a central longitudinal section through a pipe joint embodying my invention.

Figure 1:
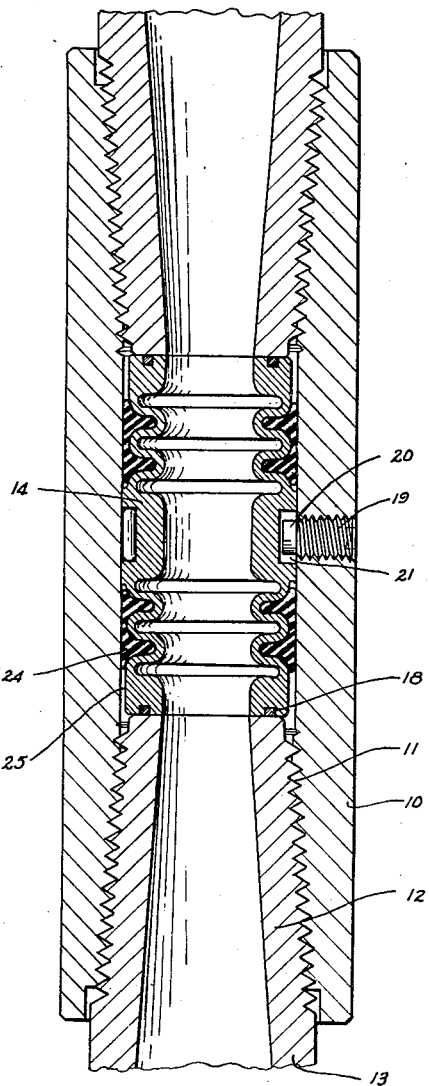
Figure 2:
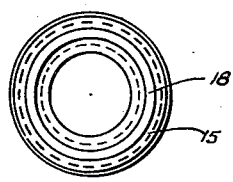
Fig. 2 is an end elevation of my improved sealing member.

In the drawing herewith I have shown a coupling member 10 of uniform internal diameter except for outwardly flaring threaded sockets 11 at each end to receive and form a connection with the tapered ends 12 of the pipe sections 13. It is to be noted that there are no shoulders or stop means on the coupling or the pipe ends to limit the inward screwing of the pipe ends relative to the coupling. It is found, however, that it is not feasible to screw the two connected ends of the pipe sections together so that they may contact and thus lock the section against unscrewing or to maintain a tight seal. The difficulty then arises that where one tube is screwed up, the other tends to unscrew, and additional take-up on either side is impossible.

Figure 3:
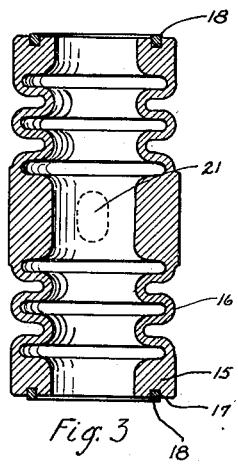
Fig. 3 is a longitudinal section of said member.
Figure 4:
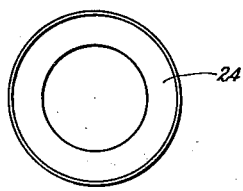
Fig. 4 is an end elevation of my filler or packing ring.
Figure 5:
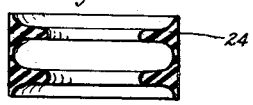
Fig. 5 is a longitudinal section through the ring shown in Fig. 4.

I have therefore provided a yielding sleeve or sealing member between the adjacent pipe ends. This sleeve has a heavy central body 14 and end rings 15 connected therewith by spring members 16 of bellows form as will be understood from Fig. 3. The end rings 15 are diametrically smaller than the body 14 therefore being loose in the bore of the coupling member 10 and leaving an annular space through which a certain flexible composition is capable of extrusion. The walls of the spring members are made sufficiently thin to provide resiliency longitudinally of the sleeve but sufficiently strong to stand the strains to be undergone in operation.

At the ends of the sleeve are formed annular grooves 17 to receive inserts 18 of soft metal such as copper to contact with the ends of the pipe sections and thus preserve a seal therewith. The use of these seal inserts may sometimes be dispensed with, as the seal between the ends of the sleeve and the pipe may commonly be preserved without the rings.

Figure 6:
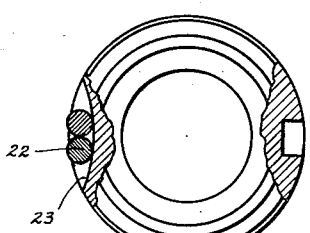
Fig. 6 is an end view of the sealing member with parts broken away to illustrate means which may be used to prevent rotation of said member.

To maintain the sleeve midway of the ends of the coupling I may use a set-screw 19 extending radially through the wall of the coupling and having a pilot point 20 thereon extending into a recess 21 in the body of the sleeve. As seen from Fig. 3 this recess 21 is slightly elongated longitudinally of the sleeve to allow a limited longitudinal movement of the sleeve but preventing rotative movement of the sleeve relative to the coupling. The set-screw will ordinarily have its outer end riveted over flush with the outer periphery of the coupling so that it cannot be unscrewed without boring. I may employ also, in combination with the set-screw, or separately, a pair of cylindrical rollers 22, set in a recess 23 in the outer surface of the body 14 of the sleeve with the axes of the rollers longitudinally of the coupling. The recess, as shown in Fig. 6, has its inner wall curved outwardly so that if relative rotation of the sleeve in the coupling tends to take place, the rollers 22 will wedge between the inner wall of the recess and the inner bore of the coupling and prevent such rotation. This device allows longitudinal movement of the sleeve in the coupling but prevents rotation as in case of the set-screw. Obviously some resilient means may be used between the rollers 22 to urge them apart if desired.

As a combined friction and sealing means, I may employ filler rings 24 of rubber or similar flexible composition shaped to fit within the outer convolutions of the spring member 16 and to bear against the bore 25 of the coupling. These filler rings 24 are under compression and frictionally engage with the coupling to prevent the movement of the sleeve in the coupling under ordinary circumstances of handling. They also form a seal and act to keep interior fluid pressures from the threads 11 of the joint, when used in combination with the rings 18 at the ends of the sleeve and when sufficient pressure is applied to the sealing member the formations of the bellows 16 cause an extrusion of the composition through the foregoing annular ring spaces toward the pin ends where it augments the seal-off of the ring and pin end contact.

In operation, the pipe sections 11 will be screwed into the coupling until the ends thereof make a tight frictional contact with the sleeve. In so doing, the spring members 16 of the sleeve will be compressed somewhat and will tend to maintain a sealing and frictional contact with the pipe end, even where the said pipe may unscrew slightly in use. As the sleeve is held against rotation, a screwing or unscrewing of one section in the coupling will not be communicated to the other pipe section. Thus each pipe section may be screwed up or reversed without affecting the tight seal of the adjacent section.

My improvement allows the use of a joint without stop shoulders on the pipe and coupling, and still maintains a close seal at the joint. Also it tends to prevent unscrewing due to the friction and pressure maintained by the resilient sleeve against the pipe ends.

What I claim as new is:

1. A tubular pipe joint for drill stems including a coupling having threaded sockets at each end to receive the pipe sections, a resilient sleeve in said coupling adapted to abut the adjacent ends of the pipe sections, and means to hold said sleeve from rotation in said coupling, but allowing longitudinal movement between them.

2. A tubular pipe joint for drill stems including a coupling having tapered threaded sockets at each end to receive the pipe sections, a resilient sleeve in said coupling adapted to abut the adjacent ends of the pipe sections, and means in the ends of said sleeve to preserve a fluid seal between said sleeve and the adjacent pipe ends.

3. A tubular pipe joint for transmitting a torsional strain including a coupling having tapered threaded sockets therein at each end to receive the ends of pipe sections, said coupling and pipe ends being free of contacting shoulders, a resilient sleeve in said coupling adapted to contact with the said pipe ends, and means to prevent rotation of said sleeve in said coupling said sleeve being adapted to be compressed between said pipe ends.

4. A pipe joint for drill stems including a tubular coupling, threaded to receive the ends of pipe sections, and a single resilient sleeve adapted to be compressed between said pipe ends, said sleeve being relatively non-rotatable and having a limited longitudinal sliding movement in said coupling.

5. A pipe joint for drill stems including a tubular coupling, formed to connect the ends of drill pipe sections, a single resilient and longitudinally compressible friction sleeve abutting the said pipe ends in said coupling, means to preserve a fluid seal between said sleeve and said pipe ends and means to reinforce said sleeve radially.

6. In a tubular pipe joint for drill stems including a coupling having a cylindrical bore and threaded sockets at each end to receive the pipe sections; a sealing member comprising a central body closely fitting the walls of the bore, end rings abutting the pipe sections loose in said bore to leave an annular space, bellows connecting the body with the rings, and a flexible composition in the space around the bellows which is subject to extrusion into said annular spaces upon the exercise of compressive forces on said end rings.

7. A sealing member for couplings of the pin and box type comprising a heavy central body portion, end rings abutable by the ends of the pins when coupled, and metallic bellows-like portions connecting the body with the end rings, said sealing member being slightly yieldable whereby a secure seal is effected notwithstanding slight variations in the length of the inserted pins due to backlash.

In testimony whereof, I hereunto affix my signature, this the 14th day of July A. D., 1930.

GUSTAVUS A. MONTGOMERY.